United States Patent
Behnamrad et al.

(10) Patent No.: US 10,654,356 B2
(45) Date of Patent: May 19, 2020

(54) TANK COVER, IN PARTICULAR AN SCR CLOSURE

(71) Applicant: REUTTER GMBH, Leutenbach (DE)

(72) Inventors: Kazem Behnamrad, Kernen (DE); Nico Woditsch, Stuttgart (DE)

(73) Assignee: REUTTER GMBH, Leutenbach (DE)

( * ) Notice: Subject to any disclaimer, the term of this patent is extended or adjusted under 35 U.S.C. 154(b) by 95 days.

(21) Appl. No.: 15/565,816

(22) PCT Filed: Apr. 14, 2016

(86) PCT No.: PCT/EP2016/058192
§ 371 (c)(1),
(2) Date: Oct. 11, 2017

(87) PCT Pub. No.: WO2016/166195
PCT Pub. Date: Oct. 20, 2016

(65) Prior Publication Data
US 2018/0111476 A1    Apr. 26, 2018

(30) Foreign Application Priority Data

Apr. 14, 2015   (DE) .................. 10 2015 105 675

(51) Int. Cl.
*B60K 15/04*       (2006.01)
*F16D 41/02*       (2006.01)
*F16D 41/12*       (2006.01)

(52) U.S. Cl.
CPC .......... *B60K 15/0406* (2013.01); *F16D 41/02* (2013.01); *F16D 41/12* (2013.01);
(Continued)

(58) Field of Classification Search
CPC ................ B60K 15/04; B60K 15/0406; B60K 2015/0451; B60K 15/035; B65D 1/0246; B65D 2543/00092; B65D 2543/00296
(Continued)

(56) References Cited

U.S. PATENT DOCUMENTS 3,977,557 A * 8/1976 Hazard ................ B65D 55/022
                                                          215/274
4,730,747 A * 3/1988 Schiemann ............ B65D 55/16
                                                          220/263
(Continued)

FOREIGN PATENT DOCUMENTS

DE          10333094 A1    3/2004
DE      102004038864 A1    4/2005
(Continued)

OTHER PUBLICATIONS

International Search Report and Written Opinion Form PCT/ISA/210 and PCT/ISA/237, International Application No. PCT/EP/2016/058192, p. 1-9, International Filing Date Apr. 4, 2016, search report dated Aug. 7, 2016.

*Primary Examiner* — Shawn M Braden
(74) *Attorney, Agent, or Firm* — Bond Schoeneck & King, PLLC

(57) ABSTRACT

The invention relates to a tank cover for mounting on a filler neck of a container, including a grip cap, a threaded part and a locking mechanism which is provided between the grip cap and threaded part, wherein the locking mechanism is formed by latching noses and by elastically deformable latching lugs interacting therewith, the latching lugs are integrally formed on the threaded part and the latching noses are integrally formed on the grip cap, or the latching lugs are integrally formed on the grip cap and the latching noses are integrally formed on the threaded part. Here, the latching (Continued)

lugs are formed on or in the vicinity of a thread turn of the threaded part.

8 Claims, 2 Drawing Sheets

(52) U.S. Cl.
CPC ............... *B60K 2015/0441* (2013.01); *B60K 2015/0451* (2013.01); *B60Y 2410/122* (2013.01)

(58) Field of Classification Search
USPC ........................................................ 220/288
See application file for complete search history.

(56) References Cited

U.S. PATENT DOCUMENTS

| | | | |
|---|---|---|---|
| 4,809,869 A | 3/1989 | Cosgrove et al. | |
| 4,941,580 A * | 7/1990 | Julian | B65D 41/32 215/225 |
| 5,027,954 A * | 7/1991 | Hickerson | B65D 50/04 215/201 |
| 5,213,223 A * | 5/1993 | Minnette | B65D 25/42 215/216 |
| 7,484,636 B2 * | 2/2009 | Yoshida | B60K 15/0406 220/293 |
| 8,875,915 B2 * | 11/2014 | Serell | A61J 1/03 215/206 |
| 9,044,768 B2 * | 6/2015 | Pouliaude | B05B 11/0054 |
| 9,051,074 B2 * | 6/2015 | Lonsway | B65D 1/0246 |
| 9,096,356 B2 * | 8/2015 | Bates | B65D 41/0464 |
| 2002/0195471 A1 * | 12/2002 | Nottingham | B01F 15/00733 222/570 |
| 2005/0077295 A1 * | 4/2005 | Reutter | F01P 11/0247 220/288 |
| 2007/0210086 A1 * | 9/2007 | Behnamrad | B60K 15/0406 220/303 |

FOREIGN PATENT DOCUMENTS

| | | |
|---|---|---|
| DE | 102013009087 A1 | 12/2014 |
| JP | 2003160160 A | 6/2006 |
| WO | 2011077360 A1 | 6/2011 |

* cited by examiner

TANK COVER, IN PARTICULAR AN SCR CLOSURE

CROSS-REFERENCE TO RELATED APPLICATIONS

This application is the United States National Stage entry under 35 U.S.C. 371 of PCT/EP2016/058192, filed Apr. 14, 2016, which claims priority to German Application Ser. No. 102015105675.5, filed Apr. 14, 2015, the entire disclosure of each of which is incorporated herein by reference.

BACKGROUND OF THE INVENTION

The invention relates to a tank cover, in particular an SCR closure.

A tank cover comprising a freewheel and a signal device is known from DE 203 08 736 U1, comprising a handle part for handling the cover when screwing it into and out of a neck that can be closed by the lid, and comprising an engagement part for engaging with the neck between an initial position and a final position. Here, the handle part and the engagement part are coupled by means of a latching device having a first and a second latching position and the handle part can be rotated relative to the engagement part from the first latching position, by overcoming a latching resistance in the screw-in direction, into the second latching position and in the process generates, by means of a signal device, a signal that can be perceived from the outside. In the first latching position, the handle part is prevented from moving relative to the engagement part in the unscrewing direction by an end stop. In the second latching position, the handle part is prevented from further rotating in the screw-in direction by a second end stop and, from this latching position, can be rotated back into the first latching position again in the unscrewing direction. The latching device comprises a latching finger which extends so as to be movable in the radial direction and is pressed radially outwards in a manner preloaded by a pressure spring. Two latching recesses which are formed in the inside of a bottom shell at an angular distance of approximately 45° from one another are assigned to the latching finger.

Other tank covers comprising torque mechanisms for closing the opening of a tank at a predetermined torque are known from DE 102 14 144 A1 and U.S. Pat. No. 6,308,852 B1, which covers are relatively complex.

In addition, a tank cover for mounting on a filler neck of a container is known from DE 10 2004 038 864 A1, comprising a grip cap, a threaded part and a locking mechanism which is provided between the grip cap and threaded part, the locking mechanism being formed by latching noses and by elastically deformable latching lugs interacting therewith, and the latching lugs being integrally formed on the threaded part and the latching noses being integrally formed on the grip cap, or the latching lugs being integrally formed on the grip cap and the latching noses being integrally formed on the threaded part.

Another tank cover comprising a locking mechanism is known from DE 103 33 094 A1.

These known tank covers are complex and still have room for improvement, in particular with respect to production costs and assembly.

SUMMARY OF THE INVENTION

The problem addressed by the invention is therefore that of improving a tank cover.

This problem is solved according to the invention by a tank cover having certain features.

The tank cover according to the invention provides a locking mechanism which is formed by latching noses and elastically deformable latching lugs interacting therewith, the latching lugs being integrally formed on the threaded part and the latching noses being integrally formed on the grip cap or, alternatively, the latching lugs being integrally formed on the grip cap and the latching noses being integrally formed on the threaded part. This integral design simplifies assembly and reduces production costs.

The latching lugs are preferably formed on or in the vicinity of a thread turn of the threaded part. This allows a particularly compact design. The latching lugs can preferably extend beyond the thread turn in the circumferential direction, if comprises a segment-like thread with thread portions distributed more or less equidistantly over the circumference in order to make it easier to position the tank cover. This embodiment also has the advantage that the latching lugs can be visually inspected, i.e. the user can identify whether all the latching lugs are present by looking into the tank cover. Disassembly for inspection or maintenance purposes is not required in respect of the latching lugs.

The latching noses particularly preferably comprise an entraining surface extending in parallel with the central longitudinal axis of the grip cap and running obliquely to the circumferential and radial direction, and an entraining surface extending in parallel with the central longitudinal axis of the grip cap and running in the radial direction, and, correspondingly, the latching lugs preferably comprise corresponding noses which project in the radial direction and comprise an entraining surface extending in parallel with the central longitudinal axis of the threaded part and running obliquely to the circumferential and radial direction, and an entraining surface extending in parallel with the central longitudinal axis of the threaded part and running in the radial direction. Here, the oblique entraining surfaces of the latching lugs and latching noses interact when the tank cover is rotated in the closing direction, and the entraining surfaces of the latching lugs and latching noses running in the radial direction interact when the tank cover is rotated counter to the closing direction. An embodiment of this kind allows a simple design of the locking mechanism and ensures sliding across the oblique entraining surfaces, while, in the screw-on direction, defined entrainment is provided across the entraining surfaces running in the radial direction.

When the tank cover is rotated in the closing direction, the latching lugs are preferably elastically deformable upon contact with the latching noses and when a predetermined force in a plane substantially perpendicular to the central longitudinal axis of the threaded part is exceeded.

The grip cap and the threaded part are preferably injection-molded plastics parts.

The threaded part preferably comprises at least two thread turns, the thread turns being segment-like and extending over a portion of the circumference. Four segments which are interrupted by regions having no thread turns are preferably provided. This saves material and thus weight. It also reduces production costs.

The threaded part is particularly preferably held in the grip cap by means of a clip connection. This allows a very simple assembly, usually without using tools.

BRIEF DESCRIPTION OF THE DRAWINGS

The invention is described in more detail in the following with reference to an embodiment. In the drawings.

DETAILED DESCRIPTION

Figure 1:
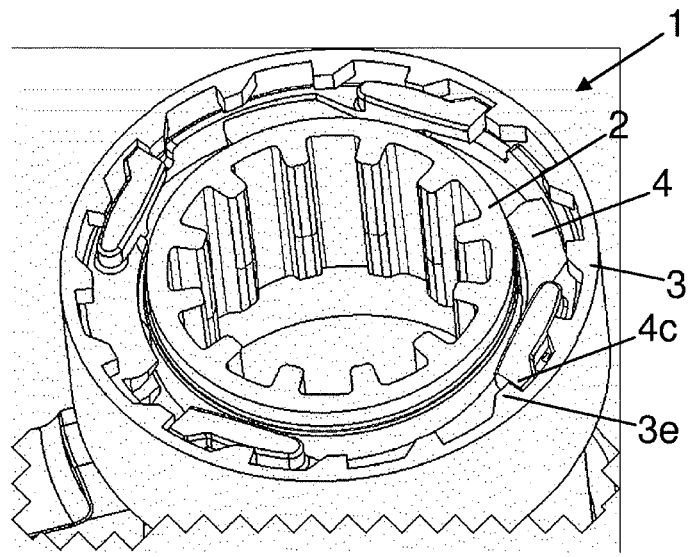
FIG. 1 is a perspective cross-sectional view of the filler neck when the tank cover according to the embodiment has been screwed on, FIG. 2 is a slightly schematized longitudinal section through the filler neck when the cover from FIG. 1 has been screwed on, FIG. 3 is a perspective sectional view of the filler neck when the tank cover from FIG. 1 has been screwed on, and comprising a retaining strap.

A tank cover 1 for closing a filler neck 2, comprising an external thread, of a vehicle tank, in the present case a diesel tank, comprises as essential components: a grip cap 3, a threaded part 4 and a molded seal 5. In addition, a membrane 6 and a retaining strap 7 are provided on the tank cover 1 as components of the tank cover 1.

Figure 2:
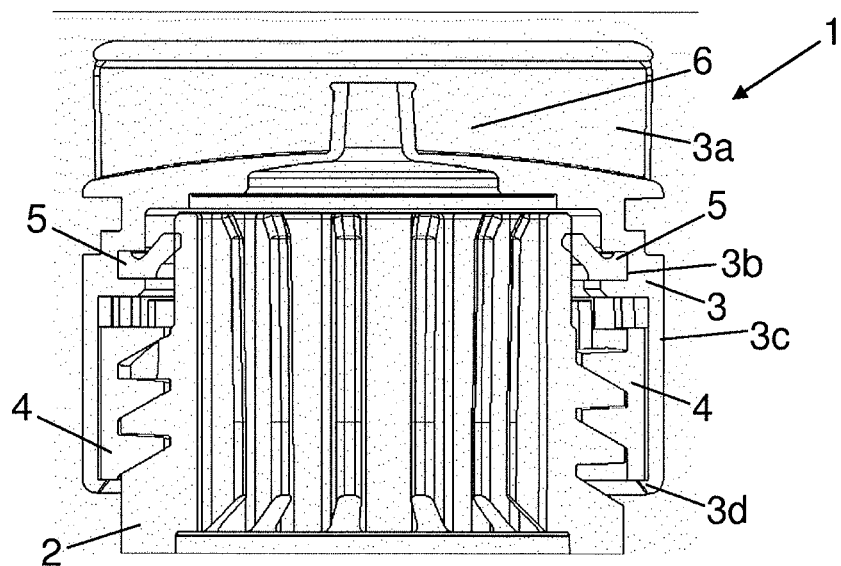
Figure 3:
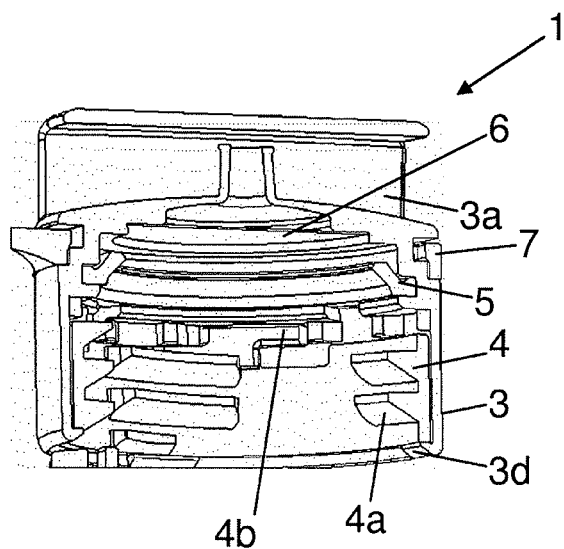
Figure 4:
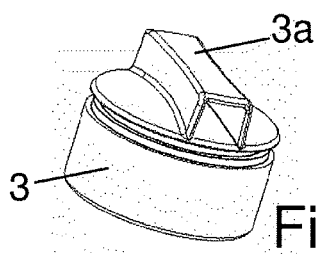
FIG. 4 is a perspective view of the grip cap.
Figure 6:
FIG. 6 is a perspective view of the molded seal.
Figure 5:
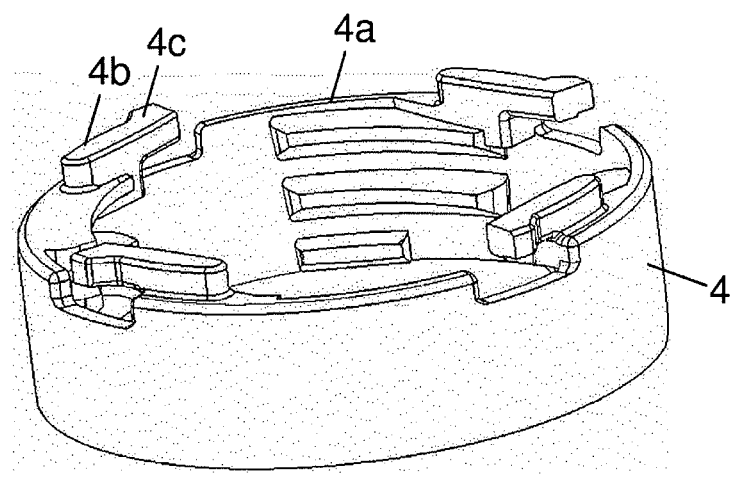
FIG. 5 is a perspective view of the threaded part.

For indications of direction, reference is made in the following to the tank cover 1 screwed correctly onto the filler neck 2, i.e. on the tank side means at the bottom in the view of the longitudinal section of FIG. 2, and remote from the tank means at the top in the view of FIG. 2.

The grip cap 3, formed by an injection-molded plastics part, in the present case a glass-fiber-reinforced polyamide. Remote from the tank, the grip cap 3 comprises, on the upper end, a grip 3a for rotating the tank cover 1. Furthermore, on the tank side of the grip 3a, a continuous groove 3b for receiving the annular molded seal 5 is provided in the inner wall of the grip cap 3. Furthermore, a hollow cylindrical receiving region 3c for receiving the threaded part 4 is provided on the tank side of the groove 3b, which receiving region ends on the tank side in a plurality of hooks 3d of a clip connection for retaining the threaded part 4 inserted in the grip cap 3, which hooks are distributed equidistantly over the circumference.

In the present case, sixteen latching noses 3e are provided on the side of the hollow cylindrical receiving region 3c for the threaded part 4 remote from the tank, which latching noses are distributed equidistantly over the circumference and comprise, on one side, oblique entraining surfaces inclined at an angle to the circumference and, on the other side, entraining surfaces running in the radial direction.

In the present case, the threaded part 4 is also an injection-molded plastics part, made of POM according to the embodiment. Said threaded part comprises an internal thread, in the present case comprising two to three thread turns 4a, the thread turns 4a extending in each case only over a limited angular range and being interrupted therebetween. Here, four regions of this kind are arranged so as to be equidistantly distributed over the circumference of the threaded part 4. These interruptions are used, inter alia, to save material and simplify the mold.

In addition, pawls in the shape of latching lugs 4b that extend beyond the corresponding threaded region in the circumferential direction, which pawls are at the rear in relation to the screw-in direction and are integrally connected to the thread turn 4a, are formed in the threaded part 4 on the end of the thread turn 4a remote from the tank. Each of the latching lugs 4b comprises a nose 4c that extends radially outwards. The nose 4c is inclined to the front in the screw-in direction so as to form an oblique entraining surface, and is designed to end at the rear in the radial direction in the screw-in direction so as to form a radial entraining surface. Here, the indications of direction relate to the undeformed state of the latching lugs 4b.

The latching lugs 4b can move relative to the thread turns 4a, in a plane parallel to the central longitudinal axis of the thread turn 4, by means of elastic deformation. According to the present embodiment, in their initial position, said latching lugs project in the radial direction approximately as far outwards as the thread turns 4a. However, the initial position of said lugs depends on the position of the latching noses 3e on the grip cap 3.

By means of the latching lugs 4b and the noses 4c, a locking mechanism is formed between the grip cap 3 and the threaded part 4, meaning that, in certain circumstances, relative movement (described in more detail below) between the threaded part 4 and the grip cap 3 is possible.

In the present case, the molded seal 5 is a V-ring made of EPDM which is used to form a seal between the tank cover 1 and a corresponding contact surface on the filler neck 2.

In order to assemble the tank cover 1, first the membrane 6 is inserted and secured in an appropriate manner in the region below the hollow grip 3a, the membrane 6 interacting in conjunction with an opening (not shown) arranged in the side of the grip cap 3 remote from the tank and being used to ventilate/degas the tank, in particular in order to prevent underpressure or overpressure. After the membrane 6 has been fitted, the molded seal 5 is inserted into the groove 3b. The threaded part 4 is then pushed into the grip cap 3 from the open side, for which purpose the hooks 3d are bent elastically outwards, and, when completely pushed in, said threaded part is clipped in by the hooks 3d springing back into their initial position such that said threaded part can be rotated relative to the grip 3a depending on the action of the locking mechanism.

If the tank cover 1 is placed on the filler neck 2, the threads engage in one another within one rotation (clockwise rotation according to FIG. 1) of a maximum of 90° clockwise. In this regard, inclined entraining surfaces (in the present case approximately 45° to the radial direction) arranged on the opposite side of the latching noses 3e come into contact with oblique entraining surfaces of the latching lugs 4b, which surfaces are arranged at a corresponding angle. The threaded part 4 is entrained in the grip cap 3 as long as the force exerted on the thread turns of the threaded part 4 by the external thread of the filler neck 2 is smaller than the force which is required to elastically deform the latching lugs 4b.

In the present case, after approximately two rotations, the tank cover 1 is screwed sufficiently tightly onto the filler neck 2 and relative movement between the grip cap 3 and the threaded part 4 is initiated since the force required for further tightening is greater than the force that can be transmitted between the grip cap 3 and the threaded part 4 via the entraining surfaces. Here, the force which is applied by the user to screw on the tank cover 1 is necessarily also greater than the force that can be transmitted via the oblique entraining surfaces. When the maximum force that can be transmitted in the closing direction is exceeded, the latching lugs 4b slide over the oblique entraining surfaces of the latching noses 3e, spring outwards and reach their initial position. By further rotating the grip cap 3 relative to the tightened threaded part 4, the process is repeated, as a result of which a clicking noise is produced, so that the user identifies that the tank cover 1 is secure.

In addition, in this screwed-on position, the molded seal 5 is in contact, from the outside in the radial direction, with the outer circumference of the upper cylindrical region of the filler neck 2, meaning that the grip part 3 is sealed with respect to the filler neck 2, the seal being arranged on the side of the thread turns remote from the tank, i.e. the thread turns, separated by the molded seal 5, are arranged outside the region which, as a result of an overpressure in the tank, can come into contact with the air located in the tank.

For opening the tank cover 1 (counterclockwise rotation according to FIG. 1), the latching lugs 4b and latching noses 3e form a lock, i.e. when the end of the nose 4c extending in the radial direction is in contact with the corresponding entraining surfaces of the latching noses 3e, which surfaces likewise extend in the radial direction, the threaded part 4 is entrained when the grip cap 3 of the tank cover 1 is rotated.

Although an integral formation of the latching lugs 4b on the threaded part 4 and an integral formation of the latching noses 3e on the grip cap 3 is described here, it is obvious to a person skilled in the art that the latching lugs 4b can in principle also be formed on the inner circumference of the grip cap 3 and the latching noses 3e can be formed on the threaded part 4.

According to the present embodiment, four latching lugs 4b and four times as many latching noses 3e are provided. Alternatively, for example, three latching lugs 4b and three or four times as many latching noses 3e, or six latching lugs 4b and twice as many latching noses 3e are also possible. Other ratios are also conceivable, but the preferred ranges are from three to eight latching lugs 4b and from twelve to 24 latching noses 3e. Moreover, the number of latching noses 3e is preferably an integer multiple of the number of latching lugs 4b.

LIST OF REFERENCE SIGNS 1 tank cover
2 filler neck
3 grip cap
3a grip
3b groove
3c receiving region
3d hook
3e latching nose
4 threaded part
4a thread turn
4b latching lug
4c nose
5 molded seal
6 membrane
7 retaining strap

What is claimed is:

1. Tank cover for mounting on a filler neck of a container, comprising a grip cap, a threaded part and a locking mechanism which is provided between the grip cap and the threaded part, the locking mechanism being formed by latching noses and by elastically deformable latching lugs interacting therewith, the latching lugs being integrally formed on either of the threaded part or grip cap and the latching noses being integrally formed on either of the grip cap or the threaded part, respectively, characterized in that the latching lugs are formed on or in the vicinity of a thread turn of the threaded part, wherein the latching noses comprise an entraining surface extending in parallel with the central longitudinal axis of the grip cap and running obliquely to the circumferential and radial direction, and an entraining surface extending in parallel with the central longitudinal axis of the grip cap and running in the radial direction, and in that the latching lugs comprise corresponding noses which project in the radial direction and comprise an entraining surface extending in parallel with the central longitudinal axis of the threaded part and running obliquely to the circumferential and radial direction, and an entraining surface extending in parallel with the central longitudinal axis of the threaded part and running in the radial direction, the oblique entraining surfaces of the latching lugs and latching noses interacting when the tank cover is rotated in the closing direction, and the entraining surfaces of the latching lugs and latching noses running in the radial direction interacting when the tank cover is rotated counter to the closing direction.

2. Tank cover according to claim 1, characterized in that, the latching lugs have an initial position, and when the tank cover is rotated in the closing direction, the latching lugs are elastically deformable upon contact with the latching noses and when a predetermined force in a plane perpendicular to the central longitudinal axis of the threaded part is exceeded, and when said predetermined force is exceeded, the latching lugs are slidable over the oblique entraining surfaces of the latching noses and springbackable to reach their initial position, whereby the grip cap is repeatedly further rotatable relative to the tightened threaded part to produce a clicking noise.

3. Tank cover according to claim 1, characterized in that the grip cap and/or the threaded part is an injection-molded plastics part.

4. Tank cover according to claim 1, characterized in that the threaded part comprises at least two thread turns, the thread turns and extending over a portion of the circumference.

5. Tank cover according to claim 4, characterized in that the latching lugs extend beyond the corresponding segments of the thread turns.

6. Tank cover according to claim 1, characterized in that the threaded part is held in the grip cap by means of a clip connection.

7. Tank cover according to claim 1, characterized in that a molded seal is inserted in a groove in the inner wall of the grip cap.

8. Tank cover according to claim 7, characterized in that the thread turns of the threaded part are positioned on the side of molded seal remote from the tank.

* * * * *